(12) United States Patent
Masuhara et al.

(10) Patent No.: US 7,564,772 B2
(45) Date of Patent: Jul. 21, 2009

(54) HIGH DENSITY OPTICAL DISC HAVING RECORDED CHARACTERS VISIBLY READABLE FROM A SUBSTRATE SIDE

(75) Inventors: Shin Masuhara, Tokyo (JP); Jun Nakano, Tokyo (JP)

(73) Assignee: Sony Corporation, Tokyo (JP)

( * ) Notice: Subject to any disclaimer, the term of this patent is extended or adjusted under 35 U.S.C. 154(b) by 549 days.

(21) Appl. No.: 10/480,125

(22) PCT Filed: Apr. 3, 2003

(86) PCT No.: PCT/JP03/04256

§ 371 (c)(1),
(2), (4) Date: Dec. 9, 2003

(87) PCT Pub. No.: WO03/085656

PCT Pub. Date: Oct. 16, 2003

(65) Prior Publication Data

US 2004/0170114 A1   Sep. 2, 2004

(30) Foreign Application Priority Data

Apr. 10, 2002 (JP) ............... 2002-108258

(51) Int. Cl.
*G11B 7/24* (2006.01)
(52) U.S. Cl. .................. 369/275.4; 369/274
(58) Field of Classification Search .............. None
See application file for complete search history.

(56) References Cited

U.S. PATENT DOCUMENTS

| | | | |
|---|---|---|---|
| 5,509,991 A * | 4/1996 | Choi | ............... 156/245 |
| 5,748,607 A * | 5/1998 | Ohira et al. | ......... 369/275.4 |
| 5,809,003 A * | 9/1998 | Taira et al. | .......... 369/275.1 |
| 5,843,626 A | 12/1998 | Ohta et al. | |
| 5,858,498 A * | 1/1999 | Ohkubo et al. | ......... 428/64.1 |
| 5,862,121 A * | 1/1999 | Suzuki | ............ 369/275.1 |
| 5,875,156 A | 2/1999 | Ito et al. | |

(Continued)

FOREIGN PATENT DOCUMENTS

EP   0 682 341 A1   11/1995

(Continued)

Primary Examiner—Tan X Dinh
(74) Attorney, Agent, or Firm—Robert J. Depke; Rockey, Depke & Lyons, LLC.

(57) ABSTRACT

An optical recording medium wherein characters can be easily recognized on an optical disk irradiated with a light through a light transmitting layer and a method of producing the same are provided. In an optical disk of a type that an optical recording layer is irradiated with a light through a light transmitting protective layer, dealing with a larger capacity, wherein one main surface of a medium substrate 15 is divided to a signal portion SG and a character portion CA, a signal portion uneven shape (15p) is formed on the signal portion SG and a character portion uneven shape (15p) is formed on the character portion CA, and depths of the signal portion uneven shape and the character portion uneven shape are 25 nm or less. Here, it is configured that characters are recorded to be able to be read as normal characters when looking from the medium substrate 15 side (Y-direction) by outlines of a region formed with the character portion uneven shape on the character portion CA.

4 Claims, 16 Drawing Sheets

U.S. PATENT DOCUMENTS

| | | | |
|---|---|---|---|
| 6,088,323 A * | 7/2000 | Kobayashi et al. | 369/275.3 |
| 6,345,034 B1 * | 2/2002 | Kim | 369/275.5 |
| 6,490,239 B1 * | 12/2002 | Nagasaka | 369/275.4 |
| 6,538,983 B1 * | 3/2003 | Satoh | 369/286 |
| 6,577,588 B1 * | 6/2003 | Tachikawa et al. | 369/275.1 |
| 6,735,166 B1 * | 5/2004 | Kusafuka et al. | 369/275.3 |
| 7,082,094 B2 * | 7/2006 | Morishima et al. | 369/116 |
| 7,119,922 B2 * | 10/2006 | Kimura et al. | 358/1.8 |
| 7,215,352 B2 * | 5/2007 | Onodera et al. | 347/225 |
| 2006/0018243 A1 * | 1/2006 | Ohtsubo et al. | 369/272.1 |
| 2008/0107007 A1 * | 5/2008 | Otsu et al. | 369/275.4 |
| 2008/0117755 A1 * | 5/2008 | Yamasaki et al. | 369/52.1 |

FOREIGN PATENT DOCUMENTS

| | | |
|---|---|---|
| EP | 1 041 563 | 10/2000 |
| EP | 1 049 095 A2 | 11/2000 |
| JP | 59-060747 | 4/1984 |
| JP | 1-264639 A | 10/1989 |
| JP | 8-273201 A | 10/1996 |
| JP | 08-287526 | 11/1996 |
| JP | 09-231616 | 9/1997 |
| JP | 10-011814 | 1/1998 |
| JP | 11-31337 A | 2/1999 |
| JP | 11-224442 | 8/1999 |
| JP | 2000-011453 | 1/2000 |
| JP | 2000-11454 A | 1/2000 |
| JP | 2000-322765 A | 11/2000 |
| JP | 2001-093189 | 4/2001 |
| JP | 2001-118289 | 4/2001 |
| JP | 2001-176124 A | 6/2001 |

* cited by examiner

FIG. 9A
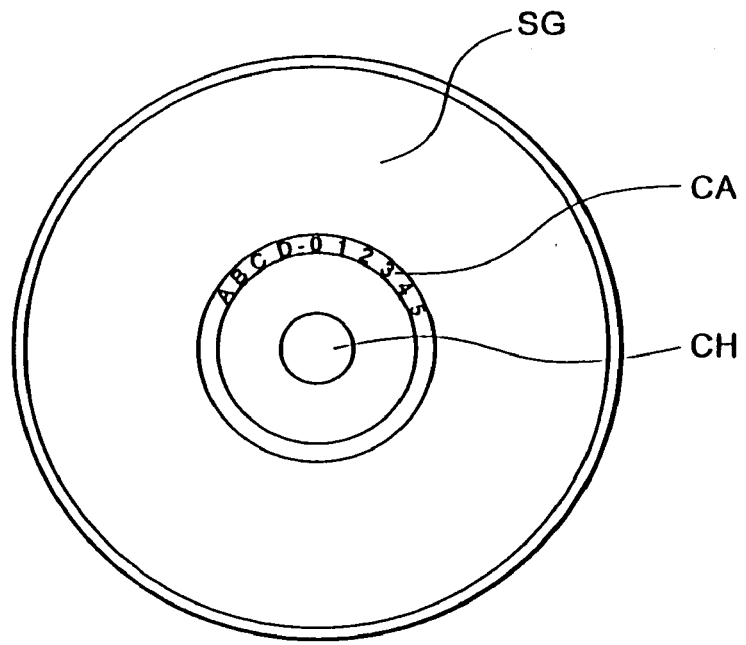
FIG. 9B
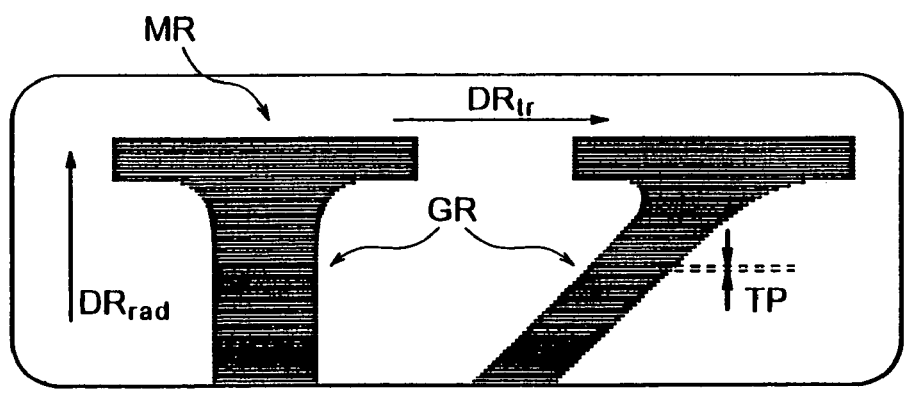
FIG. 9C

K-001  9. MAY.01

K-001  9. MAY.01

HIGH DENSITY OPTICAL DISC HAVING RECORDED CHARACTERS VISIBLY READABLE FROM A SUBSTRATE SIDE

This application claims priority to Japanese Patent Application Number JP2002-108258, filed Apr. 10, 2002, which is incorporated herein by reference.

TECHNICAL FIELD

The present invention relates to an optical recording medium (hereinafter, also referred to as an optical disk) and a method of producing it.

BACKGROUND ART

In recent years, along with a developing technique of recording a motion picture, still picture and other video data in digital, large volumes of data have come to be handled, optical disk devices, such as CDs (compact disks) and DVDs (digital versatile disks), have drawn attentions as high-capacity recording devices, and studies on attaining a further higher-capacity has been pursued.

FIG. 1A is a schematic perspective view showing a state of irradiating a light on a rewritable type optical disk according to a conventional example.

An optical disk DC has a disk shape having a thickness of 1.2 mm or so, on which a center hole CH is opened at the center portion, and driven to rotate in the driving direction DR.

When recording or reproducing information, an optical recording layer in the optical disk DC is irradiated with a light LT, such as a laser light, from an objective lens OL.

FIG. 1B is a schematic sectional view showing a state of irradiating a light and corresponds to a sectional view along the line A-A' in FIG. 1A. Also, FIG. 1C is an enlarged sectional view of a key portion.

On one surface of a medium substrate 15 made by a polycarbonate resin, etc. having a thickness of 1.1 mm or so is provided with an uneven shape including a continuous groove shaped concave portion 15d formed, for example, in spirals. On the surface thereof, an optical recording layer 16 made by a stacked structure obtained by stacking, for example, a reflection film, a dielectric film, a recording film, a dielectric film, etc. in this order. The configuration and the number of the layers of the optical recording layer 16 differ depending on a kind of a recording material and a design, and cases of a single layer configuration and a multilayer stacked structure configuration are included.

The above recording film is a-recording film including, for example, a phase change type recording film, magneto-optical recording film or an organic dye material.

Furthermore, a protective film 17 having a film thickness of 0.1 mm or so is formed on the optical recording layer 16.

When recording or reproducing the above optical disk, a recording or reproducing light LT, such as a laser light, is converged by an objective lens OL and irradiated to the optical recording layer 16 from the medium substrate 15 side.

When reproducing the optical disk, a return light reflected on the optical recording layer 16 is received by a light receiving element, a predetermined signal is generated by a signal processing circuit, and a reproduction signal is taken out.

In the above optical disk, the optical recording layer 16 has an uneven shape in accordance with an uneven shape including the continuous groove shaped concave portion 15d provided on one surface of the medium substrate 15, and the uneven shape divides a track region to lands and grooves and is used as a tracking guide groove when recording and reproducing.

There are a land-groove recording method for recording information both on the lands and grooves and a recording method of using only one of the lands and grooves as a recording region.

Also, by making the uneven shape of the above medium substrate 15 a successive pit array having a length corresponding to recording data, and providing a reflection film of an aluminum film, etc. as the above optical recording film 16, a read-only-memory (ROM) type optical disk can be also obtained.

A method of producing the above optical disk will be explained.

First, as shown in FIG. 2A, for example, on a glass substrate 10 polished to be flat and washed as a substrate of a master disk for mastering, a photoresist material, which becomes alkali-soluble by being exposed, is applied to be a predetermined film thickness of 50 to 100 nm or so to form a resist film 11, so that a resist master disk RD is formed.

Next, as shown in FIG. 2B, for example, by converging and irradiating a light for exposing the resist film on the resist film 11, moving the exposure light in the radius direction of the glass substrate 10 while rotating the glass substrate 10, and exposing by an uneven shaped pattern for transferring to the medium substrate, for example, in spirals, an exposed resist film 11b and unexposed resist film 11a are obtained.

Next, as shown in FIG. 2C, the resist film 11 is developed by an alkali developing solution. As a result, the exposed resist film 11b elutes and only the unexposed resist film 11a remains, so that an uneven shaped concave portion lid in spirals is formed on the glass substrate 10 and the resist film 11a.

From the above, a master disk for mastering is obtained.

Next, as shown in FIG. 3A, the master disk for mastering obtained above is subjected to plating processing, etc. with nickel or other material to be a thickness of, for example, 0.3 to 0.5 mm, so that a master stamper 12 is formed.

An electric plating method featuring a rapid growth rate in plating is used for the nickel plating processing, but since it is necessary that the surface of the master disk for mastering has to be conductive in advance, a nickel thin film has to be coated by a sputtering method or an electroless plating method for depositing nickel by a chemical reaction as a pretreatment.

Here, the surface of the master stamper 12 is transferred an uneven shape in an inverse pattern at the concave portion 10d on the surface of the master disk for mastering and formed with a convex portion 12p.

When a plurality of stampers are necessary for an optical disk to be mass produced, a transfer process from a stamper to stamper by nickel plating is generally used as a method of obtaining a plurality of stampers from one master disk. Below, the method will be explained.

Namely, as shown in FIG. 3B, an oxide film 12a is formed on the obtained master stamper 12 by performing oxidization processing and, furthermore, plating processing with nickel or other material is performed to form a mother stamper 13. A plurality of mother stampers 13 can be formed from one master stamper 12.

Here, the surface of the mother stamper 13 is transferred an uneven shape in an inverse pattern at the convex portion 12p on the surface of the master stamper 12 and formed with a concave portion 13d.

Next, as shown in FIG. 4A, an oxide film 13a is formed on the mother stamper 13 obtained above by performing oxidization processing and, furthermore, plating processing, etc.

with nickel or other material is performed, so that a son stamper 14 is formed. The son stamper 14 has the same uneven pattern as that of the master stamper 12. A plurality of son stampers 14 can be formed from one mother stamper 13.

Here, the surface of the son stamper 14 is transferred an uneven shape in an inverse pattern at the concave portion 13*d* on the surface of the mother stamper 13 and formed with a convex portion 14*p*.

Next, as shown in FIG. 4B, the son stamper 14 obtained above is set in a mold for injection molding, and a polycarbonate or other resin is injected to form a medium substrate 15 on the uneven pattern of the son stamper 14.

Here, the surface of the medium substrate 15 is transferred an uneven in an inverse pattern at the convex portion 14*p* on the surface of the son stamper 14 and formed with a concave portion 15*d*.

When the number of optical disks to be formed is small, the master stamper 12 may be used instead of the son stamper 14 in this injection molding process to form the medium substrate 15.

Next, as shown in FIG. 5A, on the surface of the medium substrate 15, an optical recording layer 16 made by a stacked structure composed of a dielectric film, a recording film, a dielectric film and reflection film, etc. is formed in this order, for example, by a sputtering method, etc.

Next, as shown in FIG. 5B, a protective layer 17 is formed on the optical recording layer 16.

From the above, an optical disk as shown in FIG. 1 can be produced.

In the above production process, by forming a successive signal pit arrays having a length corresponding to recording data by performing exposure in the producing process of the master disk for mastering with a light modulated to have an intensity matching with a signal pit to form an uneven shape including the concave portion 15*d* of the medium substrate 15, and forming an optical recording layer by a reflection film, such as an aluminum film, a read-only-memory (ROM) type optical disk can be also produced.

The above optical disk is divided to a character portion CA for recording characters, such as a sequential number of the master disk for mastering, production date and product information, as shown in FIG. 6A, other than a signal portion SG, such as these pits and grooves, involved in recording/reproducing of information, within the same surface (normally on the inner circumferential (center hole CH) side of the signal portion SG).

FIG. 6B is a sectional view of a part corresponding to the signal portion SG and the character portion CA on the optical disk.

Characters are drawn in the character portion CA by filling inside of outlines of the characters with discontinuous groove (GR) arrays or pit arrays. Outside of the outlines of the characters is a non-recorded portion and has a mirror face (MR), so that it makes contrast and the characters become distinct to be able to be visually recognized as characters when looking from the medium substrate side, that is, from the Z-direction.

Also, inversely, inside of the characters may be a mirror face as a non-recorded portion and outside thereof may be filled with the grooves (GR) or pit arrays.

In the exposure process in forming a master disk for mastering, exposure is performed to form grooves or pit arrays inside the outlines of characters on the above character portion. Since an exposure apparatus to be used in the exposure step generally records in spirals, it disassembles the character string in the radius direction (the track pitch direction) and records only inside of the outlines of the characters by grooves or pit arrays for every track. When exposing an adjacent track after rotating the master disk for mastering once, it is necessary to adjust timing so that the previous track and characters are combined correctly.

When a user inputs desired characters to the exposure apparatus, a character producing device inside the exposure apparatus converts the character string to a recording signal in accordance with the above operation, and the recording signal is output to an optical modulator while synchronizing with a rotation cycle of the mastering master disk at the time of exposing.

A height of a character means a length in the vertical direction of the character, which is (recording track pitch)× (the number of tracks), and is normally 1 μm pitch×1000 tracks or so, and characters are drawn to be a height of 1 mm or so.

Here, in the conventional method, when exposing the characters on the master disk for mastering, "reversed characters" (that is, characters reversed by reflecting "normal characters" on a mirror) were used for recording. The reason will be explained below.

In a conventional CD and DVD format (including a write-once type, a rewritable type and other recordable types), a disk was produced by a method of transferring from a master stamper or a son stamper to a medium substrate made by a polycarbonate resin, etc., forming a reflection film or a recording film, etc. on the medium substrate, and applying a protective film thereon.

In such an optical disk, it is easier to read characters from the medium substrate side of plastic than to read from the protective layer side. It is because when a reflection film or a recording film is formed on a pattern, concave portions, such as grooves, are buried with the reflection film or the recording film and difference in level of the concave portions, such as grooves, decreases.

Also, there are the facts that since printing is performed on the protective layer in CDs, characters are erased in some cases, and DVDs are configured that plastic medium substrates having a thickness of 0.6 mm are put together on the film formation side of a reflection film or a recording film, so that the characters can be read only from the medium substrate side.

From the above reasons, the case of being "normal characters" when looking from the medium substrate side was dominant in conventional optical disks.

To be seen as "normal characters" from the medium substrate side as above, it was necessary to record as "reversed characters" when recording the characters on the master disk for mastering. The characters are reversed when transferred from a master disk for mastering to a master stamper, transferred from the master stamper to a mother stamper, transferred from the mother stamper to a son stamper, and transferred from a variety of stampers to a medium substrate in the mastering process. In the above production method of an optical disk according to the conventional example, since transferring to the medium substrate is performed from a son stamper or a master stamper, characters have to be "normal characters" on the son stamper or the master stamper (the master stamper and the son stamper have the same character direction). That is to say, it is necessary to record as "reversed characters" on the master disk for mastering.

In an optical disk as above, a recording/reproducing laser light is converged on the optical recording layer by an objective lens and the smaller a diameter ø of a light convergence spot becomes, the finer a pattern able to be recorded and reproduced becomes.

The diameter ø of a light convergence spot is expressed by $ø=\lambda/NA$ from a wavelength $\lambda$ of the recording/reproducing laser light and a numerical aperture NA of the objective lens, which indicates that a shorter wavelength of the recording/reproducing light or a higher numerical aperture contributes to higher density recording and a larger capacity.

For example, in CDs, the recording/reproducing laser light is 780 nm, the numerical aperture (NA) of the objective lens is 0.45, and a recording capacity is 650 MB, while in DVD-ROM (read-only memory), the laser light wavelength is 650 nm, the NA is 0.6 and the recording capacity is 4.7 GB.

Furthermore, as an optical disk-system of the next generation, a development of an optical disk system has been pursued by using an optical disk of a type wherein a thin light transmitting layer of 0.1 mm or so is formed as a protective layer on the optical recording layer, the recording/reproducing light is irradiated to the optical recording layer through the protective layer, the laser light wavelength is 450 nm or less (for example 400 nm), the NA is 0.78 or more (for example 0.85), and the capacity is increased to, for example, five times as much as that of DVDs.

However, in the above large capacity optical disk, a method of transferring an uneven shape, such as grooves, from a mother stamper to a medium substrate has been examined, and when recording characters as "reversed characters" on the master disk as in the conventional example in such a production method, the characters becomes "normal characters" only when looking from the protective layer side having a thickness of 0.1 mm in the finally formed optical disk. However, in the above large capacity optical disk, grooves are made as shallow as 25 nm or less and a film thickness of a reflection film and recording film, etc, becomes thicker than the depth of the grooves, so that there is a disadvantage that it is very difficult to recognize the characters from the protective layer side having a thickness of 0.1 mm from which the characters can be read as "normal characters".

Moreover, in the case of an optical disk having an optical recording layer including a phase change type recording film, initialization after film formation is necessary to make the optical recording layer be recordable. The initialization processing is performed on the signal portion for recording signals and normally not performed on the character portion.

However, the optical recording layer including a phase change type recording film not subjected to initialization processing has a low reflectance, and there is a disadvantage that characters become harder to be recognized by a character portion uneven shape.

DISCLOSURE OF THE INVENTION

The present invention was made in consideration of the above circumstances and has as an object thereof to provide an optical recording medium capable of making characters easily recognized on an optical disk of a type wherein a light is irradiated to an optical recording layer through a light transmitting protective layer of 0.1 mm or so, dealing with a larger capacity, and a method of producing the same.

To attain the above object, an optical recording medium of the present invention is an optical recording medium comprising a medium substrate having a main surface divided to a signal portion and a character portion wherein a signal portion uneven shape is formed on said signal portion and a character portion uneven shape is formed on said character portion, an optical recording layer formed on a formation surface of said signal portion uneven shape and character portion uneven shape, and a light transmitting protective layer formed on said optical recording layer, wherein depths of said signal portion uneven shape and said character portion uneven shape are 25 nm or less, and said optical recording layer is irradiated with a light through said protective layer, wherein characters are recorded to be able to be read as normal characters when looking from said medium substrate side by outlines of regions formed with said character portion uneven shape on said, character portion.

In the above optical recording medium of the present invention, preferably, a film thickness of said optical recording layer is thicker than depths of said signal portion uneven shape and said character portion uneven shape.

In the above optical recording medium of the present invention, preferably, said optical recording layer includes a phase change type recording film, and said optical recording layer is initialized only on said signal portion.

In the above optical recording medium of the present invention, in an optical disk of a type that the optical recording layer is irradiated with a light through the light transmitting protective layer, dealing with a larger capacity, one main surface of the medium substrate is divided to a signal portion and a character portion, the signal portion is formed with a signal portion uneven shape, the character portion is formed with a character portion uneven shape, and depths of the signal portion uneven shape and the character portion uneven shape are 25 nm or less. Here, in the character portion, characters are recorded to be able to be read as normal characters when looking from the medium substrate side by outlines of regions formed with the character portion uneven shape.

Even when a depth of an uneven shape, such as grooves, becomes as shallow as 25 nm or less, it is possible to read as "normal characters" from the medium. substrate side, and recognition of the characters can be easier than in the case of reading from the protective layer side.

Also, to attain the above object, the optical recording medium of the present invention is an optical recording medium, comprising a medium substrate having a main surface divided to a signal portion and a character portion wherein a signal portion uneven shape is formed on said signal portion and a character portion uneven shape is formed on said character portion, an optical recording layer formed on a formation surface of said signal portion uneven shape and character portion uneven shape, and a light transmitting protective layer formed on said optical recording layer, wherein said optical recording layer is irradiated with a light through said protective layer, wherein said signal portion uneven shape and said character portion uneven shape have a continuous groove shaped uneven shape; wobble is formed at least on said signal portion uneven shape, and a width of a convex portion on said medium substrate is substantially constant; and characters are recorded to be able to be read as normal characters when looking from said medium substrate side by outlines of regions formed with said character portion uneven shape on said character portion.

In the above optical recording medium of the present invention, in the optical disk in an optical disk of a type that the optical recording layer is irradiated with a light through the light transmitting protective layer, dealing with a larger capacity, one main surface of the medium substrate is divided to a signal portion and a character portion, the signal portion is formed with a signal portion uneven shape, and the character portion is formed with a character portion uneven shape. Here, the signal portion uneven shape and the character portion uneven shape are continuous groove shaped uneven shape, wobble is formed at least on the signal portion uneven portion, a width of a convex portion on the medium substrate is substantially constant, and characters are recorded to be able to be read as normal characters when looking from the medium substrate side by outlines of regions formed with the character portion uneven shape on the character portion.

Wobble is formed on the signal portion uneven shape and a width of a convex portion on the medium substrate becomes substantially constant when transferring to a medium substrate from the mother stamper, not from a son stamper or a master stamper, in the production processes. Also in this case, by making it possible to read as "normal characters" from the medium substrate side, recognition of the characters can become easier than in the case of looking from the protective layer side.

Also, to attain the above object, a production method of the optical medium of the present invention is a method of producing an optical recording medium, wherein an optical recording layer formed on a medium substrate and a light transmitting protective layer thereon are provided, and said optical recording layer is irradiated with a light through the protective layer, including the steps of forming an optical recording medium producing master disk by dividing a main surface to a signal portion and a character portion, forming a signal portion uneven shape on said signal portion, and forming a character portion uneven shape on said character portion; forming a master stamper by transferring said signal portion uneven shape and said character portion uneven shape from said optical recording medium producing master disk; forming a mother stamper by transferring said signal portion uneven shape and said character portion uneven shape from said master stamper; forming a medium substrate by transferring said signal portion uneven shape and said character portion uneven shape from said mother stamper; forming an optical recording layer on a formation surface of said signal portion uneven shape and said character portion uneven shape on said medium substrate; and forming a light transmitting protective layer on said optical recording layer; wherein characters are recorded to be able to be read as normal characters on said optical recording medium producing master disk by outlines of regions formed with said character portion uneven shape on said character portion in said step of forming said optical recording medium producing master disk.

In the above production method of an optical recording medium of the present invention, preferably, said signal portion uneven shape and said-character portion uneven shape are formed to have a depth of 25 nm or less in the step of forming said optical recording medium producing master disk.

In the above production method of an optical recording medium of the present invention, preferably, said optical recording layer is formed thicker than the depths of said signal portion uneven shape and said character portion uneven shape.

In the above production method of an optical recording medium of the present invention, preferably, said step of forming said optical recording medium producing master disk includes the steps of forming a resist film on a master disk substrate, exposing said resist film with a continuous groove pattern as said signal portion uneven shape and said character portion uneven shape, and developing said resist film; and wobble is formed at least on said signal portion uneven shape in the step of exposing said resist film.

In the above production method of an optical recording medium of the present invention, preferably, an optical recording layer including a phase change type recording film is formed in the step of forming said optical recording layer; and a step of initializing only said signal portion after the step of forming said optical recording layer is further included.

In the above method of producing an optical recording medium of the present invention, one main surface is divided to a signal portion and a character portion, a signal portion uneven shape is formed on the signal portion, and a character portion uneven shape is formed on the character portion so as to form a master disk for producing an optical recording medium.

Next, a master stamper is formed by transferring the signal portion uneven shape and the character portion uneven shape from the optical recording medium production master disk, a mother stamper is formed by transferring from the master stamper, and a medium substrate is formed by transferring from the mother stamper.

Next, an optical recording layer is formed on a formation surface of the signal portion uneven shape and the character portion uneven shape on the medium substrate, and a light transmitting protective layer is formed thereon.

Here, in a process of forming the optical recording medium production master disk, characters are recorded on the optical recording medium production master disk so as to be read as normal characters by outlines of regions formed with the character portion uneven shape on the character portion.

Since the medium substrate is formed by transferring from the mother stamper and recording characters as "normal characters" when forming the optical recording medium production master disk, it is from the medium substrate side that the characters can be read as "normal characters", and recognition of the characters can be easier than in the case of looking from the protective layer side on the produced optical recording medium.

BRIEF DESCRIPTION OF DRAWINGS

FIG. 9A is a plan view showing divisions of a signal portion and a character portion of the optical disk according to the first embodiment of the present invention, FIG. 9B is an example of a character string to be recorded on the character portion, and FIG. 9C is a schematic plan view of an enlarged part of a character "K" in the character string.

BEST MODE FOR CARRYING OUT THE INVENTION

Below, embodiments of the present invention will be explained in detail by using the drawings.

The present embodiment relates to an optical recording medium (hereinafter, also referred to as an optical disk) and a method of producing the same.

First Embodiment

Figure 1A:
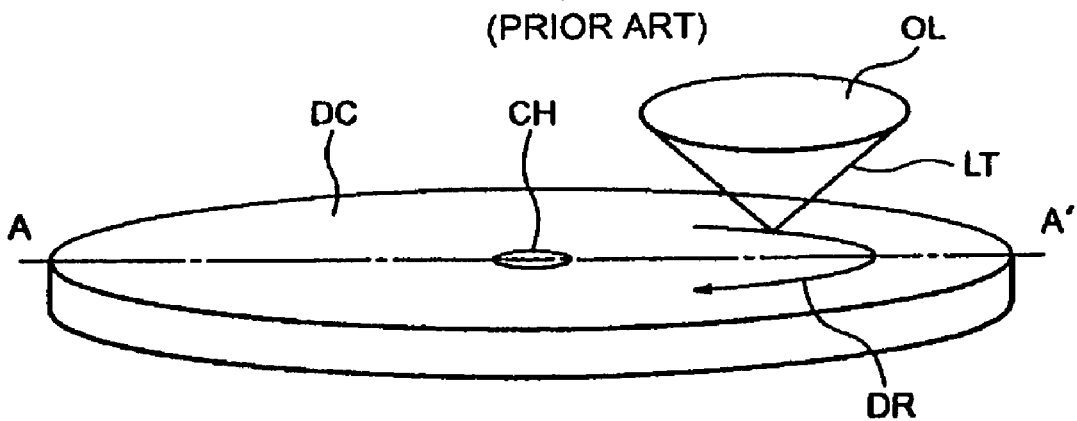
FIG. 1A is a schematic perspective view of a state of irradiating a light on an optical disk according to a conventional example.
Figure 1B:
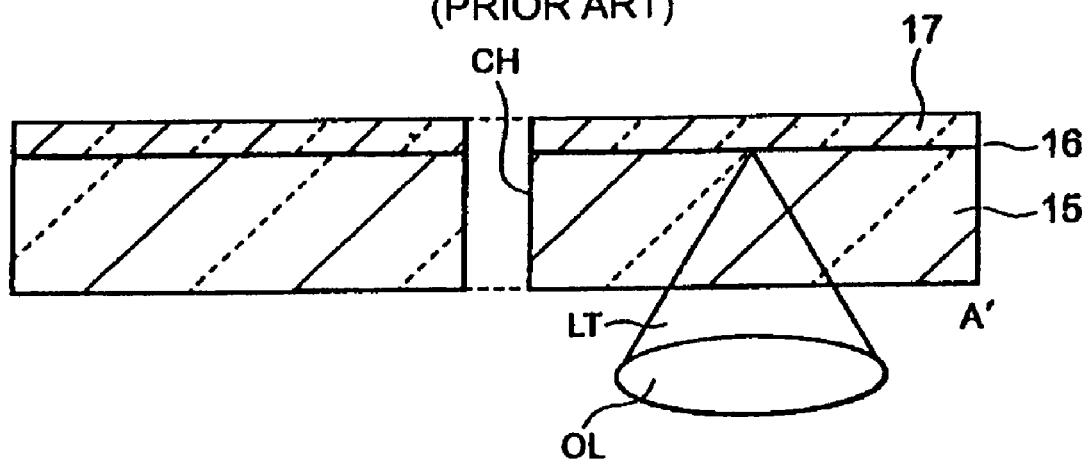
FIG. 1B is a schematic sectional view of the state of irradiating a light in FIG. 1A.
Figure 1C:
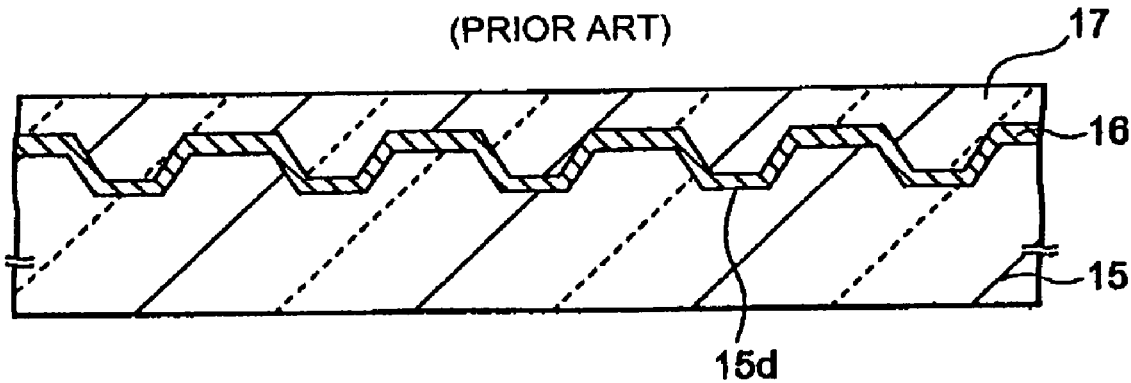
FIG. 1C is an enlarged sectional view of a key portion of FIG. 1A.
Figure 2A:
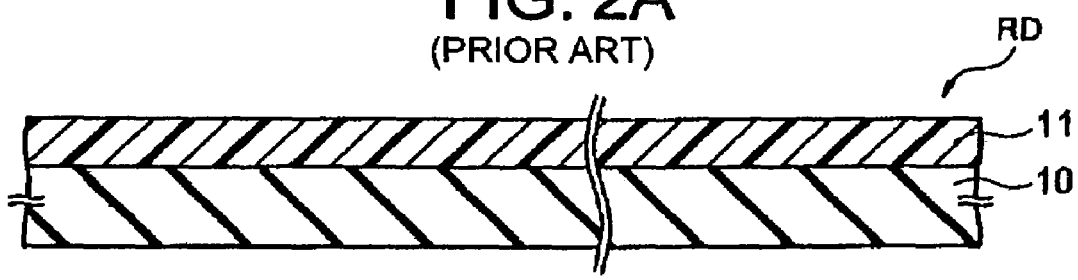
FIGS. 2A to 2C are sectional views showing production processes in a method of producing an optical disk according to a conventional example.
Figure 2B:
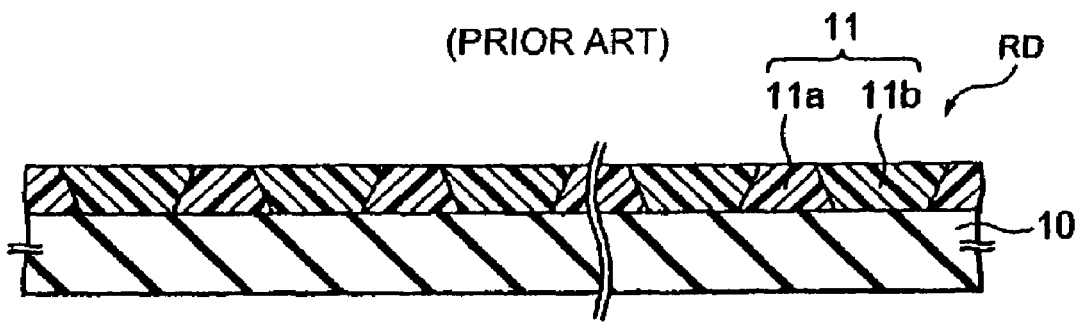
Figure 2C:
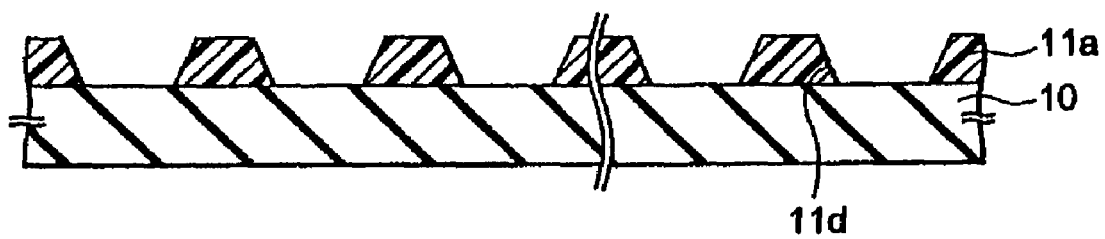
Figure 3A:
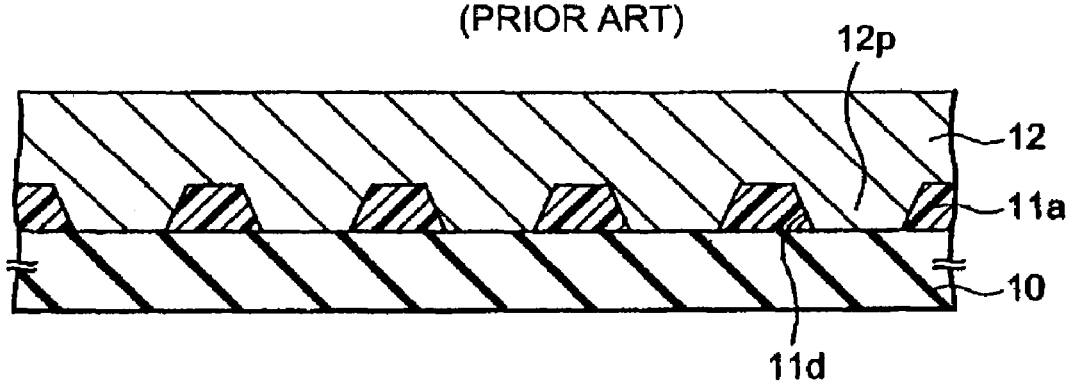
FIGS. 3A and 3B are sectional views showing processes continued from FIG. 2C.
Figure 3B:
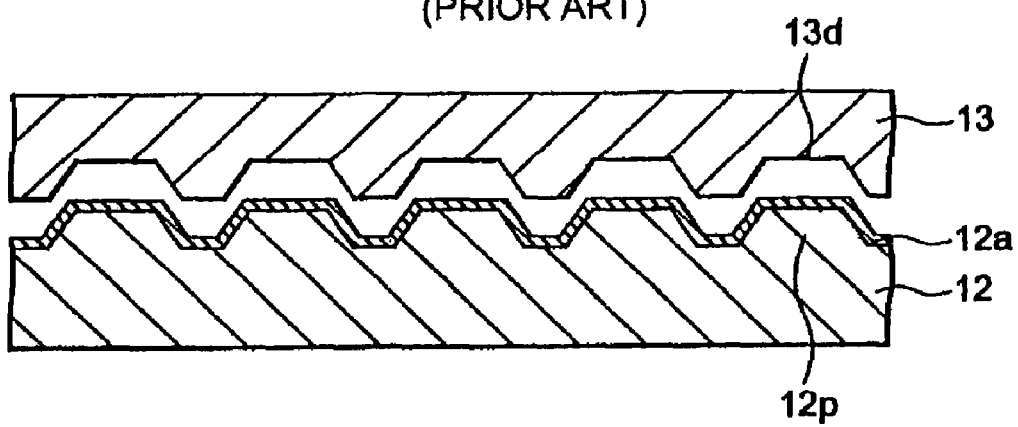
Figure 4A:
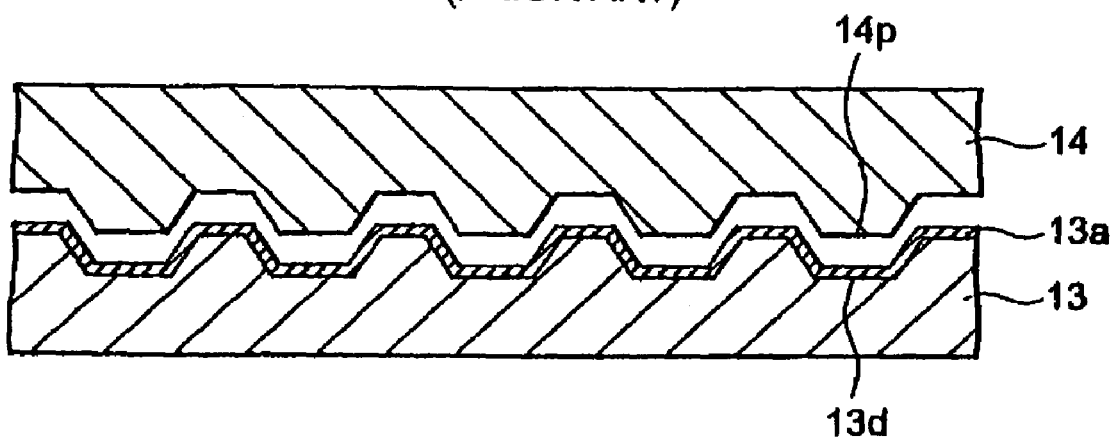
FIGS. 4A and 4B are sectional views showing processes continued from FIG. 3B.
Figure 4B:
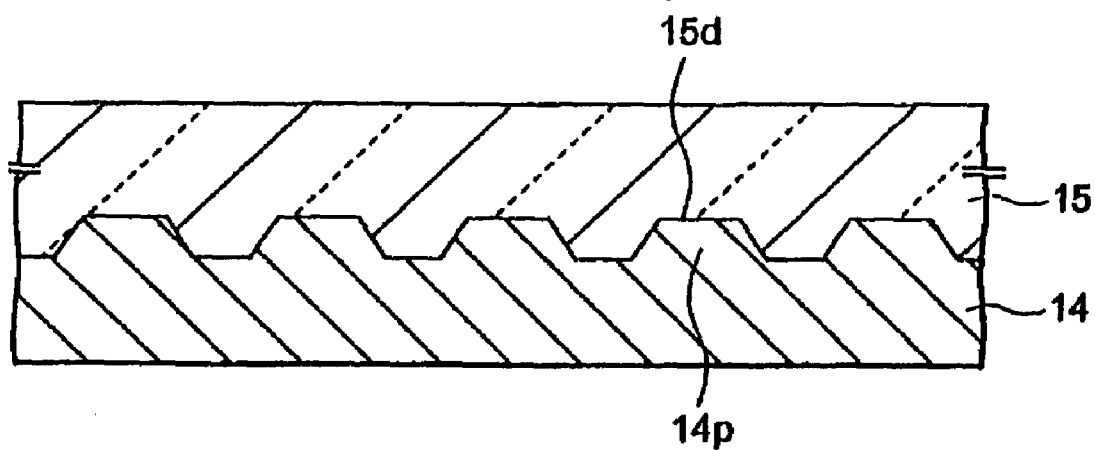
Figure 5A:
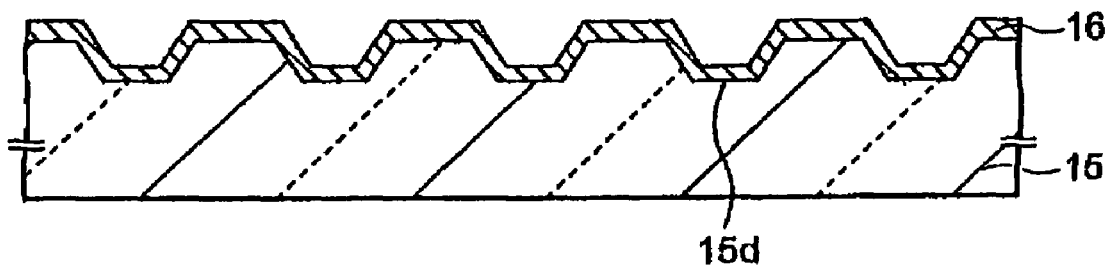
FIGS. 5A and 5B are sectional views showing processes continued from FIG. 4B.
Figure 5B:
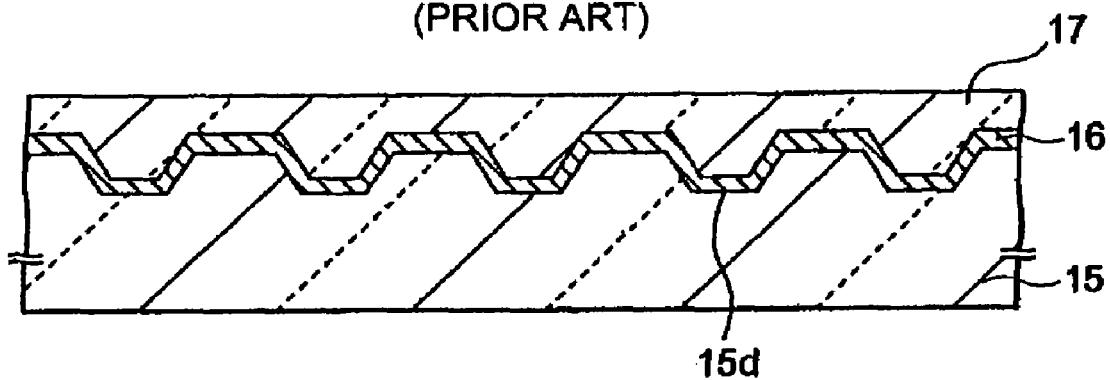
Figure 6A:
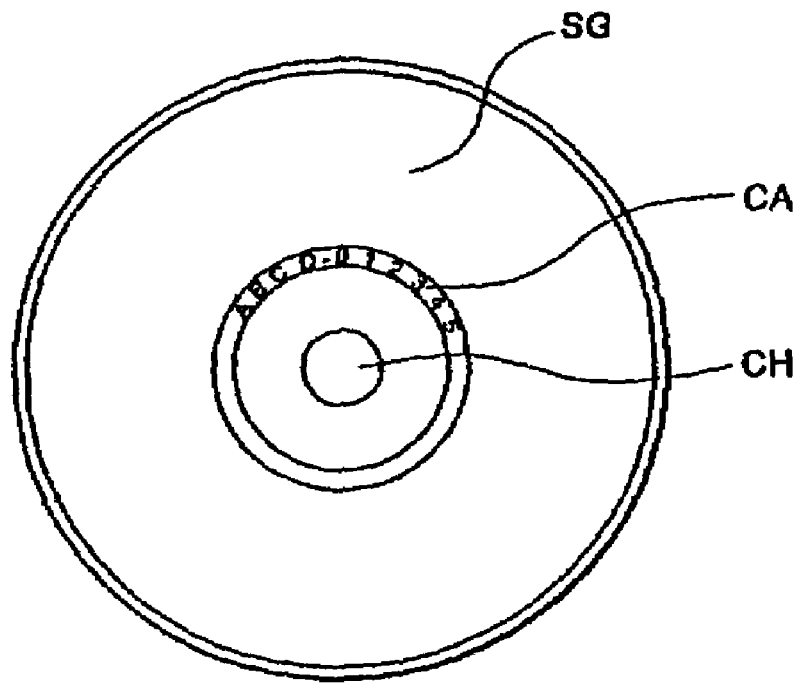
FIG. 6A is a plan view showing divisions of a signal portion and a character portion on an optical disk according to a conventional example.
Figure 6B:
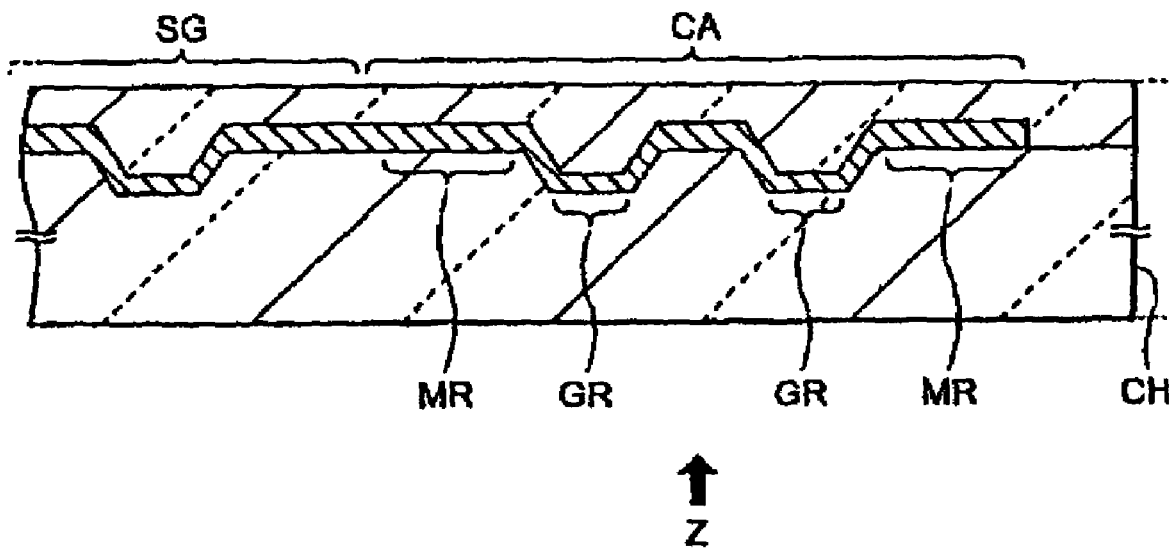
FIG. 6B is a sectional view of a portion corresponding to the signal portion and the character portion of the optical disk according to a conventional example.
Figure 7A:
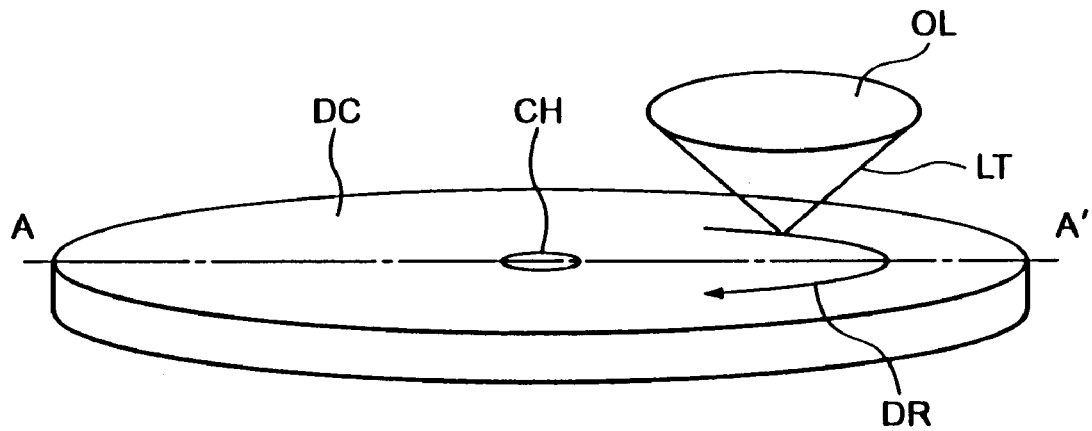
FIG. 7A is a schematic perspective view of a state of irradiating a light on an optical disk according to a first embodiment of the present invention.

FIG. 7A is a schematic perspective view of a state of irradiating a light on an optical disk according to the present embodiment.

An optical disk DC has an approximate disk shape having a center hole formed at the center portion and driven to rotate in the drive direction DR.

When recording or reproducing information, a light LT, such as a laser light in a range of blue to bluish violet color, for example, having a wavelength of 405 nm, is irradiated to an optical recording layer in a signal portion SG of the optical disk DC by an objective lens OL having a numerical aperture of 0.8 or more, for example 0.85.

Figure 7B:
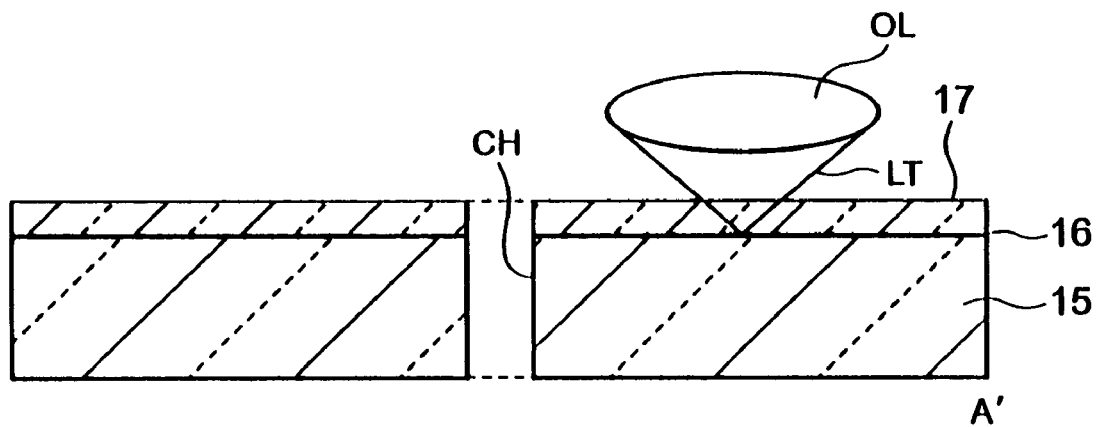
FIG. 7B is a schematic sectional view of the state of irradiating a light in FIG. 7A.
Figure 7C:
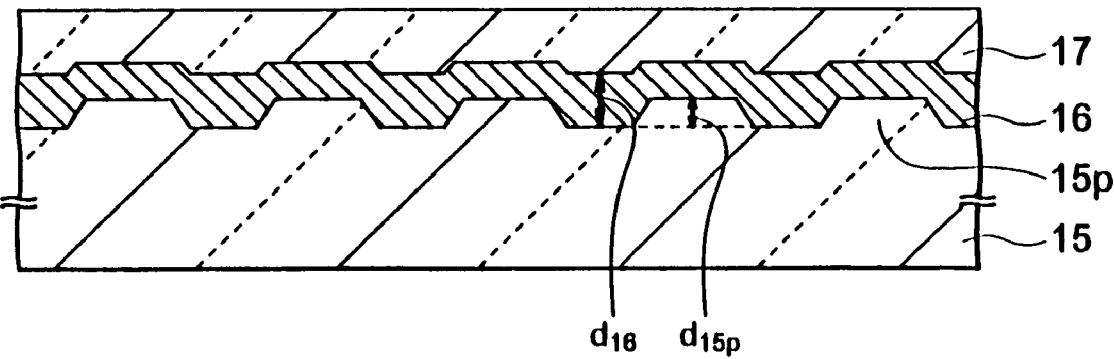
FIG. 7C is an enlarged sectional view of a key portion of FIG. 7A.

FIG. 7B is a schematic sectional view of a state of irradiating a light and corresponds to the sectional view along the ling A-A' in FIG. 7A. Also, FIG. 7C is an enlarged sectional view of the key portion.

One surface of the medium substrate 15 made by a polycarbonate resin, etc. having a thickness of 1.1 mm or so is provided with an uneven shape, for example, including a continuously formed convex portion 15p in spirals, an optical recording layer 16 is formed thereon, furthermore, a sheet polycarbonate resin film of, for example, 0.1 mm or so is adhered by an ultraviolet curing resin base adhesive on the optical recording layer 16, so that a light transmitting protective layer 17 is formed.

As for the optical recording layer 16, the optical recording layer 16 is formed by a stacked structure obtained by stacking, for example, a reflection film, a dielectric film, a recording film and a dielectric film, etc. in this order. The configuration and the number of layers of the optical recording layer 16 differ in accordance with a kind of a recording material and a design and the cases of a single layer configuration and a multilayer stacked structure configuration are included. The above recording film is a recording film including, for example, a phase change type recording film, a magneto-optical recording film or an organic dye material.

In the above optical disk, the optical recording layer has an uneven shape made by the convex portion 15p formed on the surface of the medium substrate 15.

When recording or reproducing the above optical disk, a light LT for recording or reproducing, such as a laser light, is converged by the objective lens OL and irradiated to the optical recording layer 16 from the protective layer 17 side. When reproducing the optical disk, a return light reflected on the optical recording layer 16 is received by a light receiving element, a predetermined signal is generated by a signal processing circuit, and a reproducing signal is taken out.

Figure 8A:
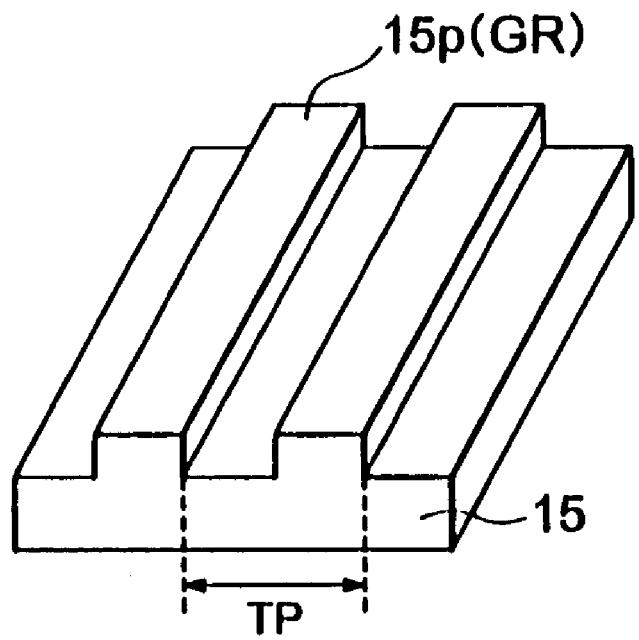
FIGS. 8A and 8B are perspective views of the configuration of a convex portion formed on a medium substrate of the optical disk according to the first embodiment of the present invention.

For example, as shown in FIG. 8A, the convex portion 15p formed on the medium substrate 15 is a continuously formed convex portion in spirals at a predetermined track pitch TP, and a track region is divided by an uneven shape including this convex portion. As will be explained later on, a region of the convex portion 15p is called a groove GR and a region of a concave portion between the convex portions 15p is called a land. Information may be recorded both on the lands and the grooves, or only one of the lands and grooves may be a recording region.

Figure 8B:
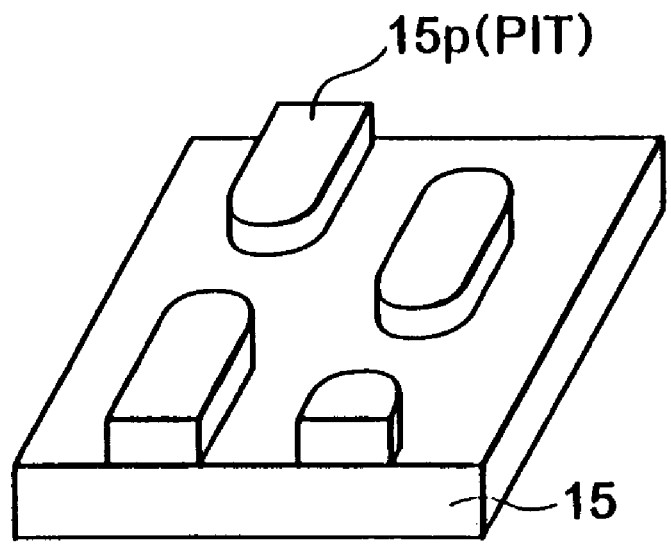

Also, for example as shown in FIG. 8B, a read-only memory (ROM) type optical disk may be obtained by configuring the convex portion 15p of the above medium substrate 15 to be a pit having a length corresponding to recording data arranged successively in spirals on the track, and configuring the optical recording layer by a reflection film, such as an aluminum film.

A depth of the uneven shape on the surface of the medium substrate 15, that is, a height d 15p of the convex portion 15p is 25 nm or less, for example 20 nm.

Also, while it depends on the configuration of the layer, a film thickness $d_{16}$ of the optical recording layer 16 is 200 nm or so, for example, when including a phase change type recording film, which is a larger value than the depth of the uneven shape on the surface of the medium substrate 15.

FIG. 9A is a plan view of the optical disk according to the present embodiment.

The above optical disk is divided to a character portion CA for recording characters, such as a sequential number of the master disk for producing optical disks, production date and product information, other than a signal portion SG, such as the pits and grooves, involved in recording/reproducing of information, within the same surface (normally on the inner circumferential (center hole CH) side of the signal portion SG).

For example, when a character string shown in FIG. 9B is recorded on the character portion, as in the schematic plan view of an enlarged part of a character "K" in the above character string shown in FIG. 9C, it is formed as a result that arrays of discontinuous grooves (GR) of a predetermined track pitch TP extending in the track direction $DR_{tr}$ are arranged in the radius direction $DR_{rad}$ of the disk-so as to fill inside of outlines of the above characters. The outside of the outlines of the characters is a non-recorded portion and has a mirror face (MR). The outside of the outlines having a mirror face as such and inside of the outlines filled with the grooves make contrast, consequently, the characters become distinct and are able to be visually recognized.

The above inside of the outlines of the characters may be configured by pit arrays instead of the grooves.

Figures 10A, 10B, 10C:
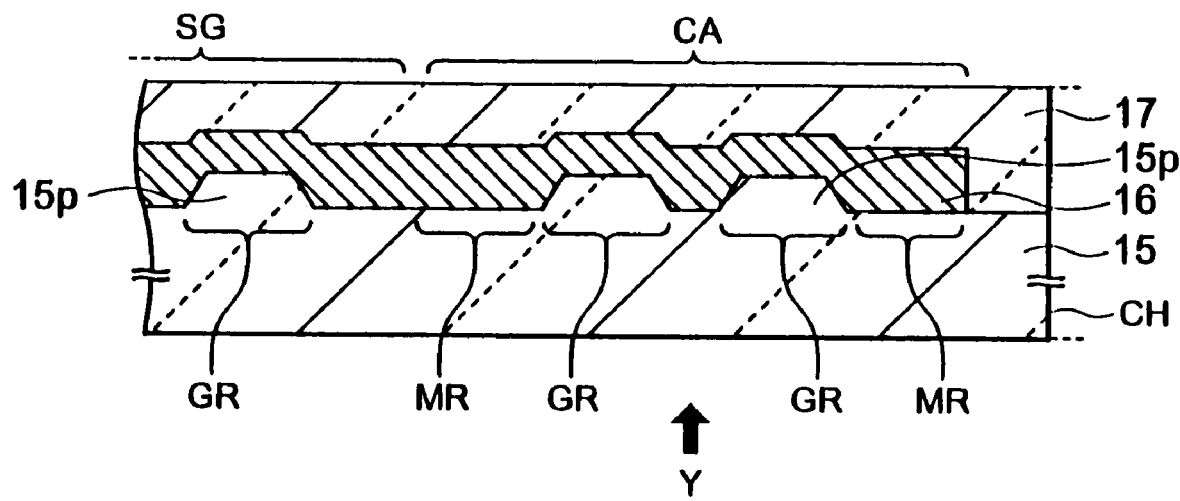
FIG. 10A is a sectional view of a part corresponding to the signal portion and the character portion of the optical disk according to the, first embodiment of the present invention.
FIG. 10B is a pattern of "normal characters" able to be read normally.
FIG. 10C is a pattern of "reversed characters" obtained by reversing the "normal characters" by a mirror.

FIG. 10A is a sectional view of a portion corresponding to the signal portion SG and the character portion CA of the optical disk.

One main surface of the medium substrate 15 is divided to the signal portion SG and the character portion CA, and the uneven shape including the convex portion 15*p* becomes a signal portion uneven shape, such as grooves GR, in the signal portion SG.

On the other hand, on the character portion CA, the uneven shape including the convex portion 15*p* becomes a character portion uneven shape, such as the grooves GR, and provided so as to fill inside of the outlines of the characters as explained above.

FIG. 10B is a pattern of "normal characters" able to be read normally, while FIG. 10C is a pattern of "reversed characters" obtained by reversing the "normal characteristics" by a mirror. When looking the character portion CA from the Y-direction, which is the medium substrate 15 side in FIG. 10A, the characters become "normal characters" as shown in FIG. 10B and able to be recognized as characters. On the other hand, when looking from the opposite direction of the Y-direction, which is the protective layer side, they become "reversed characters" as shown in FIG. 10C.

In the above explanation, the outside of the outlines of the characters is non-recorded and mirror face and inside thereof is filled with the grooves or pit arrays, however, as an inversed pattern, the characters can be recorded in the same way by the configuration wherein inside of the outlines of the characters may be non-recorded and mirror face and the outside may be filled with the grooves or pit arrays.

In the above optical disk of the present embodiment is a type of irradiating a light to the optical recording layer through the light transmitting protective layer dealing with a larger capacity, wherein one main surface of the medium substrate is divided to the signal portion and the character portion, a signal portion uneven shape is formed on the signal portion and a character portion uneven shape is formed on the character portion. Depths of the signal portion uneven shape and the character portion uneven shape are 25 nm or less, for example 20 nm. In the character portion, the characters are recorded able to be read as normal characters when looking from the medium substrate side by the outlines of regions formed with the character uneven shape.

Even when the depth of the uneven shape, such as the grooves, is as shallow as 25 nm or less and a film thickness of the optical recording layer has a larger value than the depth of the uneven shape, the characters on the character portion can be read as "normal characters" from the medium substrate side and recognition of the characters can be easier than in the case of looking from the protective layer side.

Also, since the film thickness of the optical recording layer is larger than the depth of the uneven shape on the surface of the medium substrate, the uneven shape, such as the grooves, is buried with the optical recording layer and there is almost no difference in level of the uneven shape when looking from the protective layer side, so that characters are hard to be recognized. However, in the optical disk of the present embodiment, the characters can be read as "normal characteristics" from the medium substrate side, so that the characters can be easily recognized.

When the optical recording layer includes a phase change type recording film, it is in an amorphous state immediately after the film formation, so that the reflectance is very low as 5% or so. However, the phase change type recording film of the signal portion is subjected to "initialization" by laser light irradiation for making the optical recording layer be recordable after the optical disk is completed, and thereby, the phase change type recording film is crystallized and the reflectance is improved to 25% or so. However, the initializing processing is performed on the signal portion and normally not on the character portion for reducing a processing time. Therefore, the reflectance of the character portion on the optical recording layer is unchanged to be 5% or so and characters are hard to be recognized. While, in the optical disk of the present embodiment, since it is from the medium substrate side that the characters are read as "normal characters", the characters can be easily recognized.

Next, a method of producing the optical disk according to the present embodiment above will be explained with reference to the drawings. In each drawing, respective regions of the signal portion SG and the character portion CA are shown.

Figure 11A:
FIGS. 11A to 11C are sectional views showing production processes in a method of producing the optical disk according to the first embodiment of the present invention.

First, as shown in FIG. 11A, for example, one surface of a glass substrate 10*s* having a diameter of 200 mm and a thickness of 6 mm as a substrate of master disk for mastering for producing an optical disk is polished to be flat and washed.

Figure 11B:
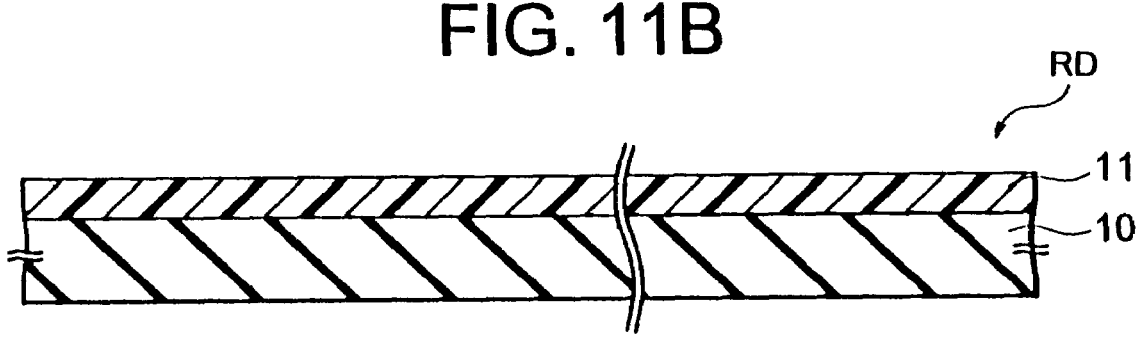

Next, as shown in FIG. 11B, for example, on the surface 10*s* of the glass substrate 10 subjected to the polishing and washing processing, a photoresist material which becomes alkali-soluble by being exposed, for example a I-line photoresist material on market, is applied by a spin-coat method to form a resist film 11 having a film thickness of 25 nm or less, for example 20 nm, so that a resist master disk RD is produced.

Figure 11C:
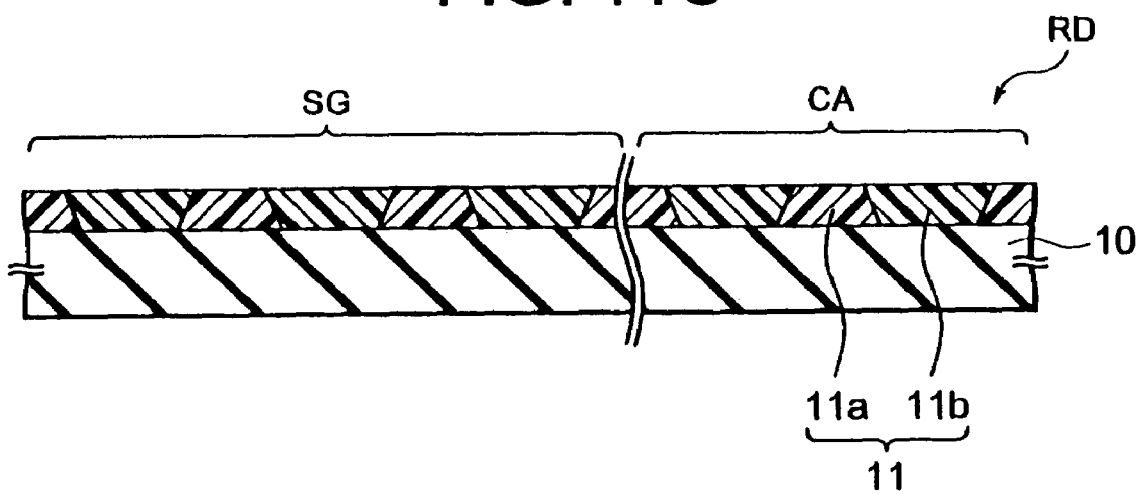

Next, as shown in FIG. 11C, on the signal portion SG having a radius of 20 to 58.5 mm on the resist master disk RD, by converging and irradiating on the resist film 11, for example, an ultraviolet laser light having a wavelength of 351 nm by an objective lens having a numerical aperture of 0.90, and moving the exposure light in the radius direction of the glass substrate 10 while rotating the glass substrate 10, exposure is performed by a pattern of a signal portion uneven shape for transferring to the medium substrate, such as a continuous groove in spirals, so that an exposed resist film 11*b* and an unexposed resist film 11*a* are obtained. For example, the recording line speed is 2.0 m/s, the recording light intensity (objective lens output) is 400 µW, and the feeding pitch is 0.35 µm.

On the other hand, on the character portion CA having a radius of 18 to 20 mm on the resist master disk RD, by converging and irradiating on the resist film 11, for example, an ultraviolet laser light having a wavelength of 351 nm by an objective lens having a numerical aperture of 0.90 in the same way as above, exposure is performed by a pattern of a character portion uneven shape so as to form grooves or pit arrays inside outlines of characters, for example, like a pattern shown in FIG. 9C on the character portion, so that an exposed resist film 11*b* and an unexposed resist film 11*a* are obtained. For example, the recording line speed is 2.0 m/s, the recording light intensity (objective lens output) is 400 µW, and the feeding pitch is 1.0 µm.

Here, the exposure pattern of the character portion uneven shape is not "reversed characteristics" as in the conventional way but is a pattern of "normal characteristics".

Since an exposure apparatus used in the exposure step generally records in spirals, it disassembles the character string in the radius direction (the track pitch direction) and records only inside of the outlines of the characters by grooves or pit arrays for every track. When exposing an adjacent track after rotating the mastering master disk once, it is necessary to adjust timing so that the previous track and characters are combined correctly.

Recording is performed by disassembling the character string to be recorded in "normal characters" pattern in the direction of upside and downside of the character for each track, making a signal waveform alternately arranged with discontinuous grooves or pit arrays and non-recorded portions so as to match each track with the shape of the character string, converting to a recording signal, and outputting the recording signal to an optical modulator while synchronizing with a rotation cycle of the master disk at the time of exposing.

A height of a character becomes (recording track pitch)× (the number of tracks), and is normally 1 μm pitch×1000 tracks or so, and characters are drawn to be a height of 1 mm or so.

Hereinafter, a portion exposed in the exposure process for forming a master disk for mastering will be referred to as a groove or a pit and an unexposed portion will be referred to as a land.

Figure 12A:
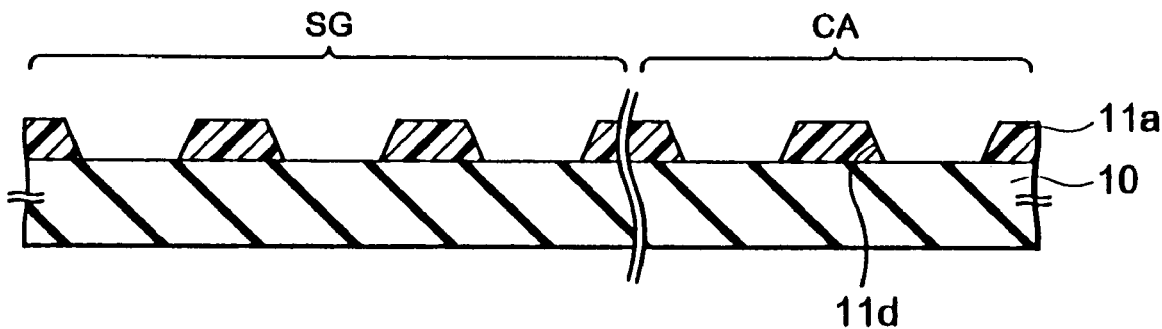
FIGS. 12A to 12C are sectional views showing processes continued from FIG. 11C.

Next, as shown in FIG. 12A, the resist film 11 with both of the signal portion SG and the character portion CA is subjected to development processing by an alkali developing solution (for example, a product name of NMD-3) for twenty seconds. As a result, the exposed resist film 11b elutes and only the unexposed resist film 11a remains, so that a master disk for mastering for producing an optical disk is obtained.

An uneven shape including a concave portion 11d is formed by the glass substrate 10 and the resist film 11a. Namely, the signal portion SG is formed with a signal portion uneven shape and the character portion CA is formed with a character uneven shape as a pattern of "normal characters", respectively. Here, a region of the concave portion 11d corresponds to an exposure portion in the exposure process and becomes a groove (or a pit).

Figure 12B:
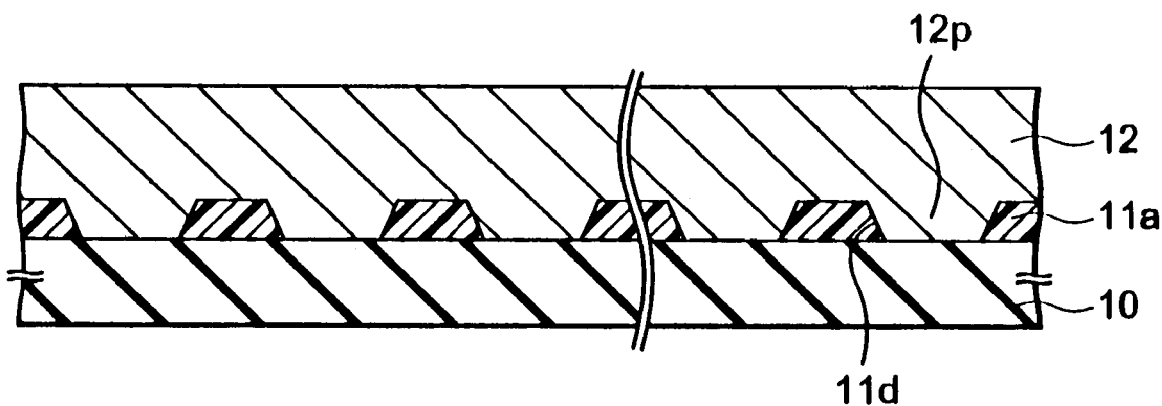

Next, as shown in FIG. 12B, plating processing, etc. with nickel or other material is performed on the obtained mastering master disk to be a thickness of, for example, 290 μm or so, so that a master stamper 12 is formed.

An electric plating method featuring a rapid growth rate to plating is used for the nickel plating processing, but since it is necessary that the surface of the master disk for mastering has to be conductive in advance, a nickel thin film has to be coated by a sputtering method or a electroless plating method for depositing nickel by a chemical reaction as a pretreatment.

Here, an uneven pattern of the master disk for mastering is transferred as an inversed pattern to be an uneven pattern of the surface of the master stamper 12, and the concave portion 11d corresponding to a groove on the master disk for mastering becomes a convex portion 12p of the master stamper 12. A height of the convex portion 12p of the master stamper 12 corresponds to a film thickness of the resist film 11 and is 25 nm or less, for example 20 nm.

As explained above, in the master stamper 12, a pattern to be a signal portion uneven shape is formed on the signal portion SG and a pattern to be a character portion uneven shape as a reversed pattern, "reversed characters", is formed on the character portion CA.

Figure 12C:
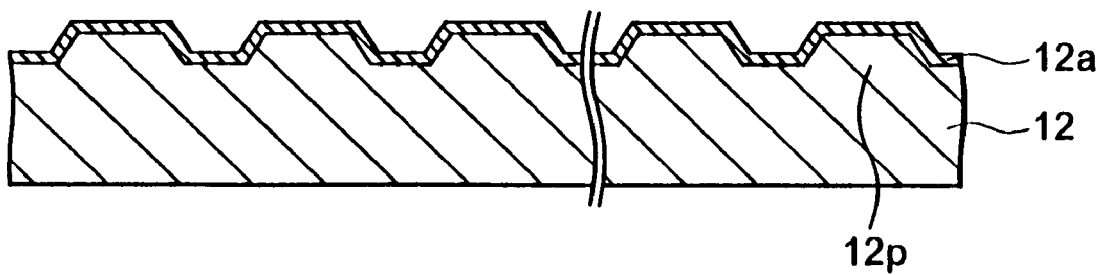

Next, as shown in FIG. 12C, an oxide film 12a is formed by performing oxidization processing, such as dipping processing of bichromate, on the master stamper 12 obtained above.

Figure 13A:
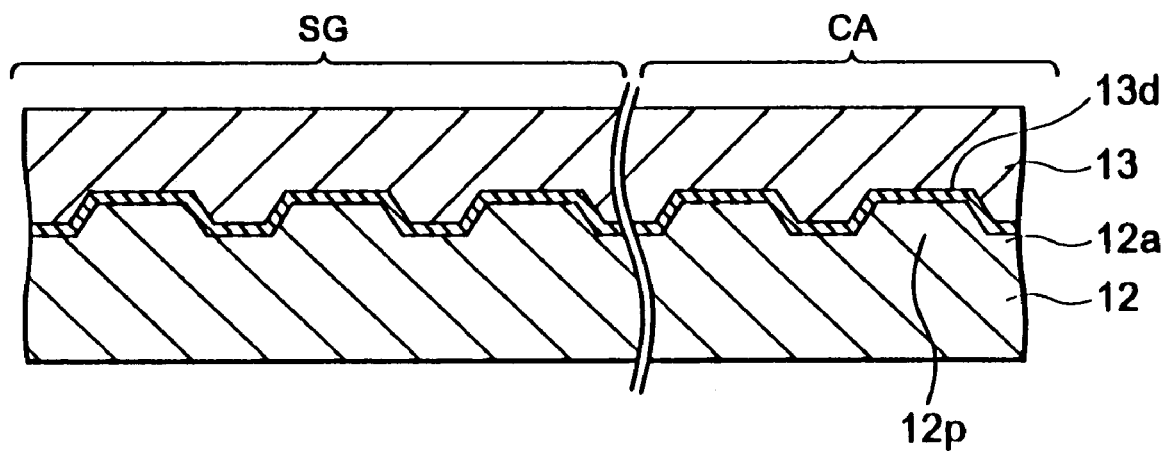
FIGS. 13A and 13B are sectional views showing processes continued from FIG. 12C.

Next, as shown in FIG. 13A, plating processing, etc. with nickel or other material is performed on the obtained mastering master 12 to be a thickness of, for example, 290 μm or so, so that a mother stamper 13 is formed. A plurality of mother stampers 13 can be formed from one master stamper 12.

When separating the mother stamper 13 from the master stamper 12, the oxide film 12a serves as a separation film for easy separation.

Here, an uneven pattern of the mastering master 12 is transferred as an inversed pattern to be an uneven pattern of the surface of the mother stamper 13, and the convex portion 12p on the master stamper 12 corresponding to a groove becomes a concave portion 13d of the mother stamper 13. A depth of the concave portion 13d of the mother stamper 13 corresponds to a height of the convex portion 12p of the master stamper 13 and is 25 nm or less, for example 20 nm.

As explained above, in the mother stamper 13, a pattern to be a signal portion uneven shape is formed on the signal portion SG and a pattern to be a character portion uneven shape as an again reversed pattern, "normal characters", is formed on the character portion CA.

Figure 13B:
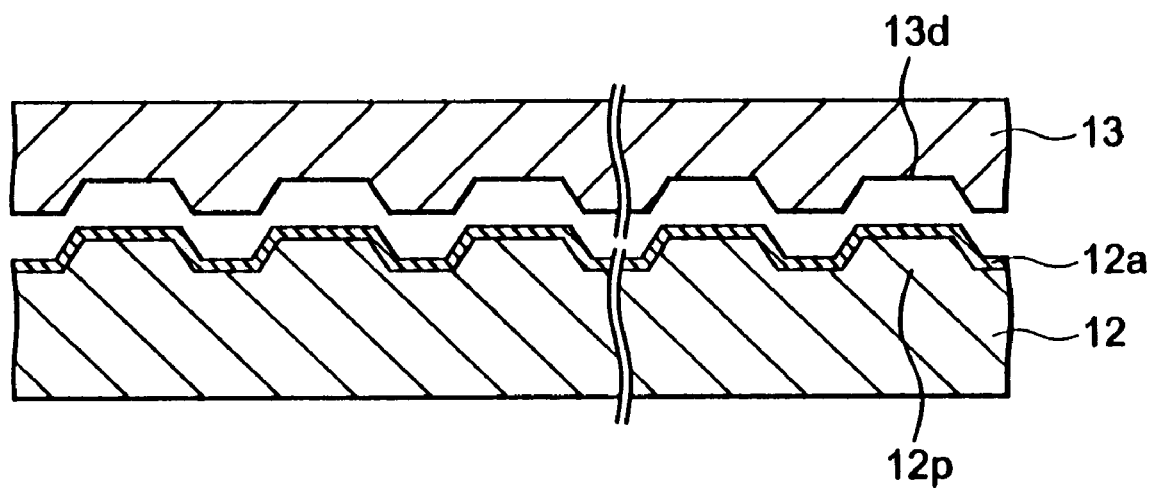

Next, as shown in FIG. 13B, the mother stamper 13 is obtained by separating from the master stamper 12.

Figure 14A:
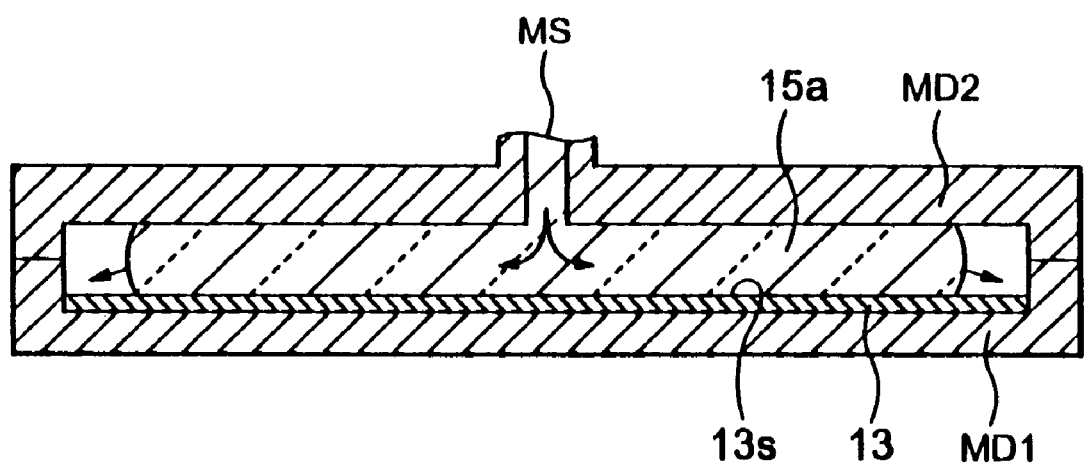
FIGS. 14A and 14B are sectional views showing processes continued from FIG. 13B.

Next, as shown in FIG. 14A, the obtained mother stamper 13 is arranged in a cavity made by molds (MD1 and MD2) so that an uneven shape formation face 13s of the mother stamper faces inside of the cavity and fixed to configure a mold of an injection molding.

Figure 14B:
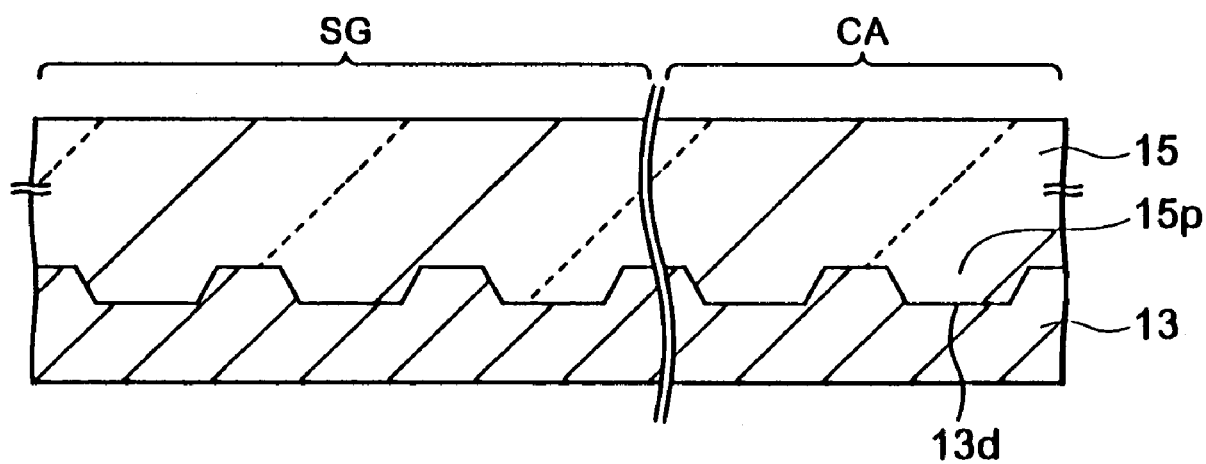

By injecting a resin. 15a, such as polycarbonate in a molten state, from an injection hole MS of the mold into the cavity of the above mold of the injection molding, a medium substrate 15 is formed on the mother stamper 13 as shown in FIG. 14B.

Here, the uneven shape of the mother stamper 13 is transferred as an inversed pattern to be an uneven pattern of the surface of the medium substrate 15, and the concave portion 13d corresponding to a groove on the mother master 13 becomes a convex portion 15p of the medium substrate 15. A height of the convex portion 15p of the medium substrate 15 corresponds to a depth of the concave portion 13d of the mother stamper 13 and is 25 nm or less, for example 20 nm.

As explained above, in the medium substrate 15, a pattern to be a signal portion uneven shape is formed on the signal portion SG and a pattern to be a character portion uneven shape as a further reversed pattern, "reversed characters", is formed on the character portion CA.

Figure 15A:
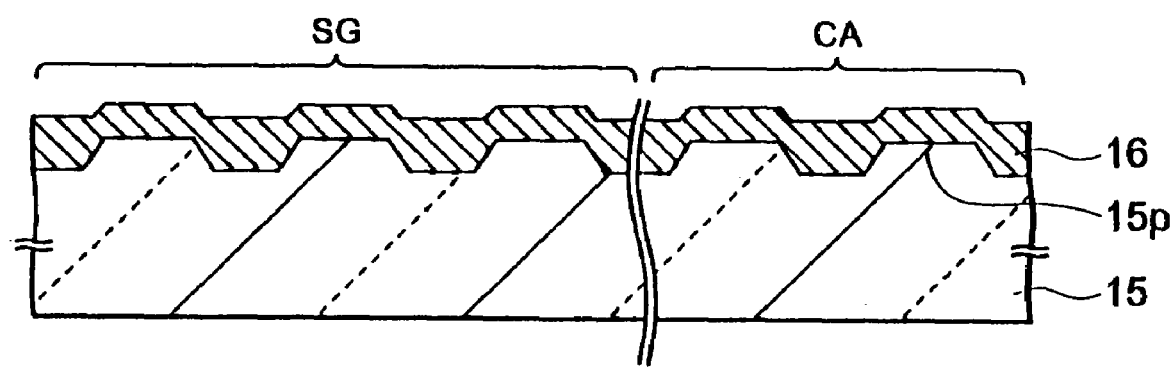
FIGS. 15A and 15B are sectional views showing processes continued from FIG. 14B.

Next, as shown in FIG. 15A, on the surface of the medium substrate 15, an optical recording layer 16 made by a stacked structure composed of a reflection film, a dielectric film, a recording film and a dielectric film, etc. is formed in this order, for example, by a sputtering method, etc. on the signal portion SG and the character portion CA.

While it depends on the configuration of the layer, the optical recording layer 16 is formed to be 200 nm or so, for example, when including a phase change type recording film. This is a larger value than the depth of the uneven shape on the surface of the medium substrate 15.

For example, the films are formed in the order of, for example, an aluminum reflection film of 100 nm, a ZnS—SiO$_2$ film of 20 nm, a phase change type recording film of GeSbTe, etc. of 15 nm and a ZnS—SiO$_2$ film of 80 nm. As a result, a total film thickness d$_{16}$ of the optical recording layer 16 becomes 215 nm, which is sufficiently thick comparing with the depth d$_{15p}$ of a pattern of characters, etc. (for example 20 nm), so that the surface after the film formation is almost flat and recognition of the pattern from the signal transferred surface side is extremely difficult.

Figure 15B:
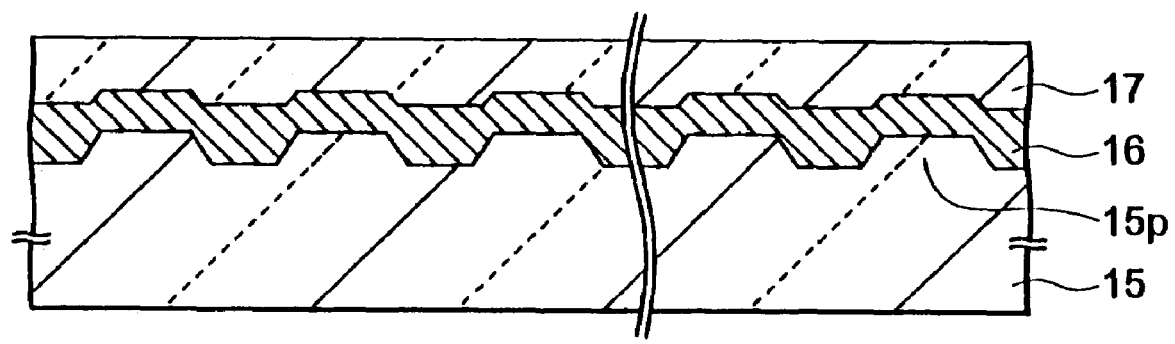

Next, as shown in FIG. 15B, on the signal portion SG and the character portion CA, a sheet polycarbonate resin film of 0.1 mm is placed over an ultraviolet ray curing resin base adhesive applied to be uniformly thin, for example, by a spin coat method and adhered by ultraviolet ray irradiation, so that a protective layer 17 is formed on the optical recording layer 16.

When forming an optical recording layer including a phase change type recording film as the above optical recording layer 16, initialization is performed for making the optical recording layer be recordable after the film formation, that is, before or after the formation process of the above protective layer. Here, in the signal portion SG and the character portion CA, initialization is performed only on the signal portion SG. Initialization is normally not performed on the character portion.

From the above, an optical disk as shown in FIG. 7 can be produced.

On the character portion CA of the thus produced optical disk, characters by the convex portion 15p of the medium substrate 15 have a "reversed characters" pattern, so that they become "normal characters" when looking the character portion CA from the medium substrate 15 side and able to be read as "normal characters" from the medium substrate 15 side.

In the above production processes, by forming a successive signal pit array having a length corresponding to recording data as an uneven shape including the concave portion 15d of the medium substrate 15 by performing exposure with a light modulated to have an intensity matching with a signal pit in the producing process of the master disk for mastering, and by forming an optical recording layer by a reflection film, such as an aluminum film, a read-only memory (ROM) type optical disk can be also produced.

In the production method of an optical disk according to the present embodiment as above, since the medium substrate is formed by transferring from the mother stamper and characters are recorded as "normal characters" at the time of forming the mastering master disk, it is from the medium substrate side that the characters can be read as "normal characters" in the produced optical disk.

A depth of the uneven shape of the medium substrate corresponds to a height of the convex portion 15p of the medium substrate 15 and is 25 nm or less, for example 20 nm, but even when the depth of the uneven shape, such as the grooves, is as shallow as 25 nm or less as such, the characters can be read as "normal characters" from the medium substrate side, thus, recognition of the characters can be easier than in the case of looking from the protective layer side.

Also, since the film thickness of the optical recording layer is larger than the depth of the uneven shape on the surface of the medium substrate, the uneven shape, such as the grooves, is buried with the optical recording layer and there is almost no difference in level of the uneven shape when looking from the protective layer side, so that characters are hard to be recognized. However, in the optical disk produced by the production method of the present embodiment, the characters can be read as "normal characteristics" from the medium substrate side, so that the characters can be easily recognized.

When the optical recording layer includes a phase change type recording film, it is in an amorphous state immediately after the film formation, so that the reflectance is very low as 5% or so. However, the phase change type recording film of the signal portion is subjected to "initialization" by laser light irradiation for making the optical recording layer be recordable after the optical disk is completed, and thereby, the phase change type recording film is crystallized and the reflectance is improved to 25% or so. However, the initializing processing is performed on the signal portion and normally not performed on the character portion for reducing a processing time. Therefore, the reflectance of the optical recording layer of the character portion is unchanged to be 5% or so and characters are hard to be recognized. While, in the optical disk produced by the production method of the present embodiment, since it is from the medium substrate side that the characters are read as "normal characters", the characters can be easily recognized.

Second Embodiment

An optical disk according to the present embodiment is substantially the same as that in the first embodiment, but is different in that wobble is formed on grooves as an uneven shape of the signal portion.

Figure 16:
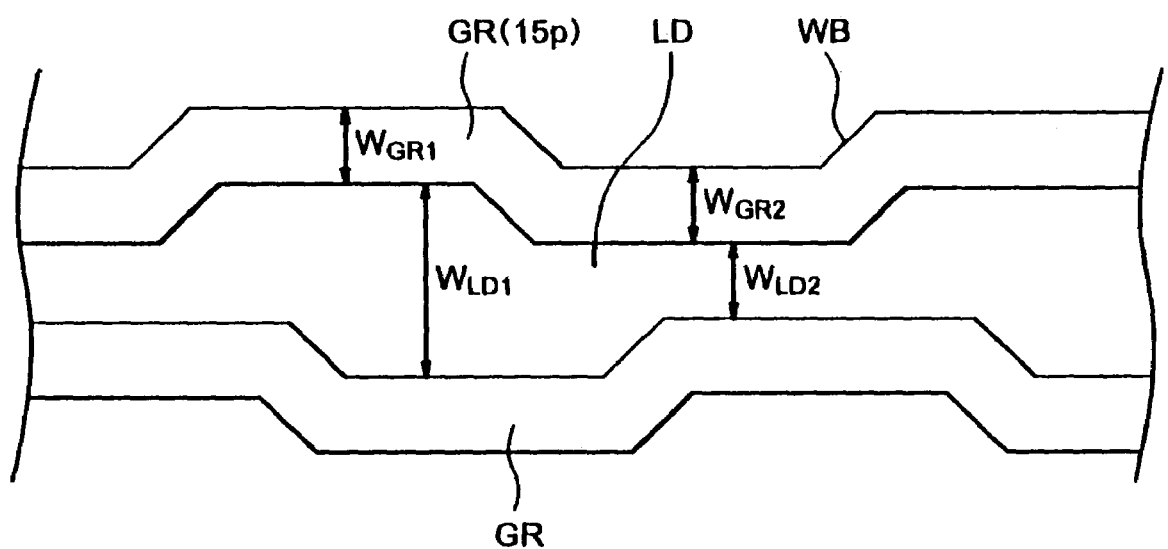
FIG. 16 is a plan view showing a state of wobble provided on grooves on an optical disk according to a second embodiment of the present invention.

FIG. 16 is a plan view of a state of wobble provided on grooves. In the same way as in the first embodiment, the convex portion 15p on the medium substrate 15 becomes a groove GR and a concave portion between the convex portions 15p becomes a land LD.

Grooves GR on the signal portion are provided with wobble WB oscillating at a predetermined cycle as shown in FIG. 16. Address information, etc. can be obtained from a signal obtained from the wobble WB and an increase of a recording capacity can be attained.

The above grooves GR have a substantially constant width. This is because the wobble WB is obtained by oscillating an exposure light at a predetermined cycle when exposing the resist film on the master disk for mastering, and a width of the grooves GR corresponding to an exposed region corresponds to a spot diameter of the light, which becomes substantially constant. For example, a groove width $W_{GR1}$ at a certain position and a groove width $W_{GR2}$ at other position in the figure are substantially equal.

On the other hand, phases of adjacent grooves GR are not always matched, so that a width of the lands LD is not constant. For example, a land width $W_{LD1}$ at a certain position and a land width $W_{LD2}$ at other position in the figure are largely different.

Also in the above optical disk according to the present embodiment, a signal portion and a character portion are divided on the same surface as in the first embodiment, wherein the character portion is, for example, formed with grooves or pit arrays so as to fill inside of outlines of characters, and the characters are "normal characters" when looking the character portion from the medium substrate side and able to be recognized as characters. Here, wobble may not be provided to the grooves on the character portion.

The above optical disk according to the present embodiment can be produced in the same way as in the first embodiment by oscillating an exposure light at a predetermined cycle when exposing the resist film on the master disk for mastering.

Accordingly, in the exposure of the resist film on the master disk for mastering, an exposure pattern of a character portion uneven shape to be exposed to the character portion is a "normal characteristics" pattern in the same way as in the first embodiment.

In the optical disk according to the present embodiment as above, wobble is formed on the grooves and a width of a convex portion on the medium substrate is substantially constant, that is, becomes a groove, in the case of transferring from the mother stamper to the medium substrate, not from the son stamper nor master stamper, in the production process.

Also in this case, by making it possible to be read as "normal characters" from the medium substrate side in the same way as in the first embodiment, the characters can be recognized more easily than in the case of looking from the protective layer side.

The present invention is not limited to the above embodiments.

For example, the layer configuration of the optical recording layer is not limited to the configuration explained in the embodiments and may be a variety of configurations in accordance with a material of the recording film, etc., and able to be adopted to a magneto-optical recording medium, an optical disk using an organic dye material and, furthermore, a read-only optical disk other than a phase change type optical recording medium.

Also, the present invention can be applied not only to an optical disk having one optical recording layer, but to an optical disk stacked with two or more optical recording layers via an interlayer. In any case, the character portion uneven shape is provided on the medium substrate so as to be "normal characters" when looking from the medium substrate side.

Other than the above, a variety of modifications may be made within a scope of the present invention.

According to the optical recording medium of the present invention, even when a depth of an uneven shape, such as grooves, becomes as shallow as 25 nm or less, or when wobble is formed on the signal portion uneven shape and a width of a convex portion on the medium substrate is substantially constant, by making it possible to be read as "normal characters" from the medium substrate side, characters can be recognized more easily than in the case of looking from the protective layer side.

According to the production method of an optical recording medium of the present invention, since the medium substrate is formed by transferring from the mother stamper and characters are recorded as "normal characters" when forming the optical recording medium producing master disk, the characters can be read as "normal characters" from the medium substrate side and recognition of the characters can become easier than in the case of looking from the protective layer side.

INDUSTRIAL APPLICABILITY

The present invention can be applied to an optical disk able to deal with memory formats of a re-writable type, etc. having an optical recording layer using a recording material including a phase change type recording material, a magneto-optical recording material or an organic dye material as a recording material, and capable of realizing a low cost large capacity file and to a production method thereof.

The invention claimed is:

1. An optical recording medium, comprising:
a substrate having a signal portion and a character portion wherein a signal portion uneven shape is formed at said signal portion and a character portion uneven shape is formed at said character portion, an optical recording layer formed over said signal portion uneven shape and character portion uneven shape portions, and a light transmitting protective layer formed over said optical recording layer, wherein depths of said signal portion uneven shape and said character portion uneven shape are 25 nm or less, and said optical recording layer is irradiated with a light through said protective layer to read information defined by said signal portion uneven shape from a side of the optical recording medium opposite the substrate side, wherein:
characters are recorded and are oriented to be read when looking at said substrate side by outlines of regions formed with said character portion uneven shape and further wherein a film thickness of said optical recording layer is thicker than depths of said signal portion uneven shape and said character portion uneven shape.

2. An optical recording medium as set forth in claim 1, wherein:
said optical recording layer includes a phase change type recording film; and
said optical recording layer is initialized only at said signal portion.

3. An optical recording medium, comprising a substrate having a signal portion and a character portion wherein a signal portion uneven shape is formed at said signal portion and a character portion uneven shape is formed at said character portion, an optical recording layer formed over said signal portion uneven shape and character portion uneven shape portions, and a light transmitting protective layer formed over said optical recording layer, wherein said optical recording layer is irradiated with a light through said protective layer to read information defined by said signal portion uneven shape from a side of the optical recording medium opposite the substrate side, wherein:
said signal portion uneven shape and said character portion uneven shape have a continuous groove arrangement;
wobble is formed at least in said signal portion uneven shape, and a width of a convex portion of said substrate is substantially constant; and
characters are recorded and are oriented to be read when looking at said substrate side by outlines of regions formed with said character portion uneven shape and further wherein a film thickness of said optical recording layer is thicker than depths of said signal portion uneven shape and said character portion uneven shape;
wherein the depths of said signal portion uneven shape and said character portion uneven shape are 25 nm or less.

4. An optical recording medium as set forth in claim 3, wherein:
said optical recording layer includes a phase change type recording film; and
said optical recording layer is initialized only in said signal portion.

* * * * *